(12) United States Patent
Lim et al.

(10) Patent No.: US 9,507,461 B2
(45) Date of Patent: Nov. 29, 2016

(54) INPUT APPARATUS AND INPUT METHOD OF A PORTABLE TERMINAL USING A PEN

(75) Inventors: Choongkwon Lim, Suwon-si (KR); Sanghyeok Oh, Seoul (KR); Joohoon Lee, Yongin-si (KR); Dohee Kang, Suwon-si (KR); Junyun Kim, Yongin-si (KR); Jungchul An, Suwon-si (KR); Yongseob Yun, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 191 days.

(21) Appl. No.: 13/595,630

(22) Filed: Aug. 27, 2012

(65) Prior Publication Data

US 2013/0082950 A1  Apr. 4, 2013

(30) Foreign Application Priority Data

Sep. 29, 2011  (KR) .......................... 10-2011-0098836

(51) Int. Cl.
  *G06F 3/041*  (2006.01)
  *G06F 3/044*  (2006.01)
  *G06F 3/0488*  (2013.01)

(52) U.S. Cl.
  CPC ............. *G06F 3/0418* (2013.01); *G06F 3/044* (2013.01); *G06F 3/0488* (2013.01)

(58) Field of Classification Search
  CPC ........................ G06F 3/03545; G06F 3/0418
  USPC .................. 345/156–158, 173, 178, 179; 178/18.01–20.04
  See application file for complete search history.

(56) References Cited

U.S. PATENT DOCUMENTS

| | | | |
|---|---|---|---|
| 4,477,877 A | 10/1984 | Nakamura et al. | |
| 4,577,057 A | 3/1986 | Blesser | |
| 5,198,623 A * | 3/1993 | Landmeier .................. | 178/18.02 |
| 5,534,886 A | 7/1996 | Nomura et al. | |
| 2005/0162411 A1 | 7/2005 | Berkel Van | |
| 2006/0139326 A1 | 6/2006 | Tsukamoto | |
| 2007/0300182 A1 | 12/2007 | Bilow | |
| 2008/0158175 A1* | 7/2008 | Hotelling et al. ............. | 345/173 |
| 2010/0188371 A1* | 7/2010 | Lowles ............... | G06F 3/04886 345/178 |
| 2010/0206644 A1 | 8/2010 | Yeh | |
| 2010/0207893 A1 | 8/2010 | Yeh et al. | |
| 2012/0206397 A1* | 8/2012 | Zawacki et al. .............. | 345/174 |
| 2013/0009907 A1* | 1/2013 | Rosenberg et al. ........... | 345/174 |

FOREIGN PATENT DOCUMENTS

| | | |
|---|---|---|
| CN | 101751174 A | 6/2010 |
| CN | 101807134 A | 8/2010 |
| CN | 101807135 A | 8/2010 |

(Continued)

*Primary Examiner* — Seokyun Moon
(74) *Attorney, Agent, or Firm* — Jefferson IP Law, LLP

(57) ABSTRACT

An input apparatus of a portable terminal and an input method for compensating an input from a pen to increase the accuracy of the pen are provided. The input apparatus includes a touch panel configured to generate an input signal according to a pen touch, a memory configured to store at least one lookup table in which data for compensating an error of a pen input according to a user's pen usage characteristic is stored, a controller configured to detect an input coordinate of the pen touch on the touch panel and configured to extract compensation data from the lookup table corresponding to the input coordinate to compensate the error of the pen input, and a display unit configured to display a compensated pen input signal.

15 Claims, 6 Drawing Sheets

(56) References Cited

FOREIGN PATENT DOCUMENTS

| CN | 102156585 A | 8/2011 |
| CN | 102375646 A | 3/2012 |
| JP | H02-201520 A | 8/1990 |
| KR | 10-2009-0095682 A | 9/2009 |
| WO | 03/105073 A2 | 12/2003 |

* cited by examiner

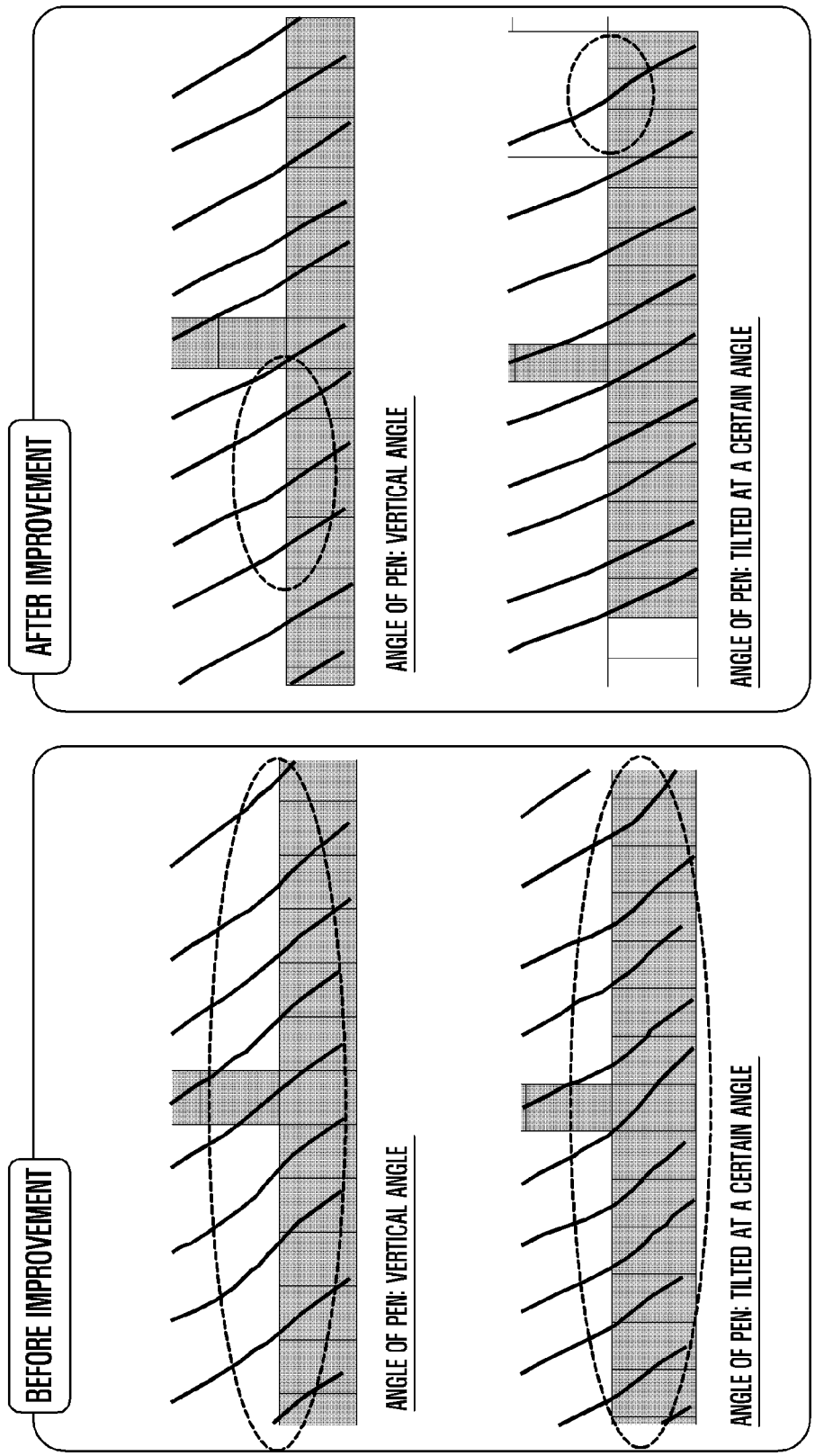

INPUT APPARATUS AND INPUT METHOD OF A PORTABLE TERMINAL USING A PEN

PRIORITY

This application claims the benefit under 35 U.S.C. §119(a) of a Korean patent application filed on Sep. 29, 2011 in the Korean Intellectual Property Office and assigned Serial No. 10-2011-0098836, the entire disclosure of which is hereby incorporated by reference.

BACKGROUND OF THE INVENTION

1. Field of the Invention

The present invention relates to an input apparatus and an input method of a portable terminal using a pen. More particularly, the present invention relates to an apparatus and a method for compensating an input from a pen to increase the accuracy of the pen.

2. Description of the Related Art

A current portable terminal includes various input apparatuses. For example, the portable terminal generally includes a touch screen in which a touch sensor and a display unit are integrated. Also, the portable terminal having the touch screen is developed such that an input may be entered not only by a user's finger but also by a pen. Here, the pen may be an electric pen, such as an Electro Magnetic Resonance (EMR) pen. When using the pen input method, a user may generate various types of input such as a drawing and text data by using the pen. Therefore, the pen input apparatus is expected to be widely used in the future.

Generally, in use of an EMR pen, a coordinate of the pen may be detected through a signal applied to a basic sensor board and a controller extracts an input coordinate of the pen through an algorithm for basic interpolation and compensation.

However, in a method of extracting the input coordinate of the pen as described above, the coordinate extraction algorithm has a limitation in that an exact coordinate may not be extracted. Namely, when using the pen, a position of the extracted coordinate may be different according to a user's characteristic (e.g., whether the user is left handed or right handed, etc.). Also, the position of the coordinate may be different depending on an angle at which the pen touches the touch panel. Furthermore, the position of the coordinate may be different depending on a position of the touch panel relative to the user when the user uses the pen.

In addition, accuracy of the coordinate may be different depending on an area of the touch panel. In other words, a center area of the touch panel has higher accuracy while a peripheral area of the touch panel has lower accuracy due to the strength of a signal referenced for extracting the coordinate being weak in the peripheral area of the display panel as compared to the center area of the display panel. Accordingly, there is a need for an apparatus and a method for improving the accuracy of an input coordinate in a portable terminal equipped with an electric pen.

SUMMARY OF THE INVENTION

Aspects of the present invention are to address the above-mentioned problems and/or disadvantages and to provide at least the advantages described below. Accordingly, an aspect of the present invention is to provide an apparatus and a method for improving the accuracy of an input coordinate of a pen in a portable terminal equipped with an electric pen.

Another aspect of the present invention is to provide an apparatus and a method for improving the accuracy of an input coordinate of a pen in a portable terminal equipped with an Electro Magnetic Resonance (EMR) pen.

Still another aspect of the present invention is to provide an input apparatus and an input method using a pen that considers a user's usage characteristic, location of a portable terminal, and a characteristic of a touch panel.

In accordance with an aspect of the present invention, an input apparatus of a portable terminal is provided. The input apparatus includes a touch panel configured to generate an input signal according to a pen touch, a memory configured to store at least one lookup table in which data for compensating an error of a pen input according to a user's pen usage characteristic is stored, a controller configured to detect an input coordinate of the pen touch on the touch panel and configured to extract compensation data from the lookup table corresponding to the input coordinate to compensate the error of the pen input, and a display unit configured to display a compensated pen input signal.

In accordance with another aspect of the present invention, a method of compensating a pen input of a portable terminal is provided. The method includes detecting an input coordinate of a pen according to a touch on a touch panel of the portable terminal, the portable terminal including the touch panel configured to generate an input signal according to a pen touch and a memory configured to store at least one lookup table in which data for compensating an error of the pen input according to a user's pen usage characteristic is stored, extracting compensation data corresponding to the input coordinate from the lookup table by using the input coordinate as an index, generating a compensated pen input signal by reflecting the extracted compensation data to the input coordinate outputted from a coordinate detection unit; and displaying the compensated pen input signal on a display unit.

In accordance with another aspect of the present invention, a method of compensating a pen input of a portable terminal is provided. The method includes selecting a lookup table in a pen input mode according to a direction of the portable terminal and a preset user's pen usage characteristic by detecting the direction of the portable terminal in the portable terminal including a touch panel configured to generate an input signal according to a pen touch, a sensor configured to detect the direction of the portable terminal, and a memory configured to store at least one lookup table in which data for compensating an error of the pen input according to the user's pen usage characteristic or the direction of the portable terminal is stored; and compensating a pen input signal by reflecting compensation data of the lookup table selected upon detection of the pen input corresponding to a coordinate of the pen input and displaying the compensated pen input signal.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other objects, features, and advantages of certain exemplary embodiments of the present invention will be more apparent from the following description taken in conjunction with the accompanying drawings, in which:

FIG. 6 is a view illustrating a result of compensating a pen input in a portable terminal according to an exemplary embodiment of the present invention.

Throughout the drawings, it should be noted that like reference numbers are used to depict the same or similar elements, features, and structures.

DETAILED DESCRIPTION OF EXEMPLARY EMBODIMENTS

Figure 1:
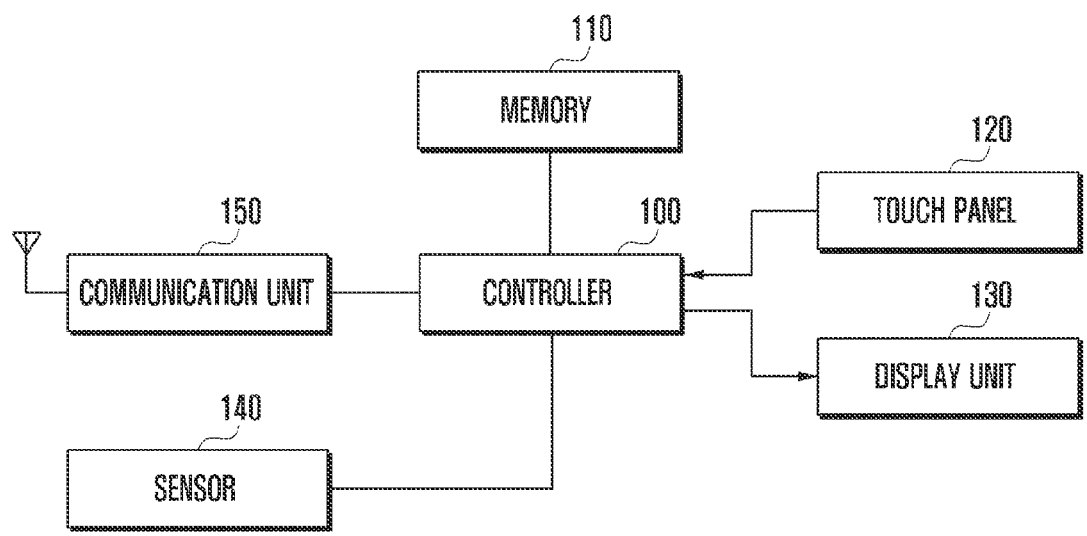
FIG. 1 is a view illustrating a configuration of a portable terminal according to an exemplary embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Hereinafter, exemplary embodiments of the present invention will be described below with reference to the accompanying drawings. Exemplary embodiments of the present invention described below suggest an apparatus and a method for improving the accuracy of an input from a pen in a portable terminal equipped with an electric pen. More particularly, in exemplary embodiments of the present invention, it is assumed that the electric pen is an Electro Magnetic Resonance (EMR) pen that uses electromagnetic induction. However, it should be noted that the present invention is not limited to an EMR pen and the same function and the same effect of the present invention can apply to all types of electric pens.

Also, the term "user's pen usage characteristic," used herein refers to a characteristic including at least one of whether a user is left handed or right handed, an angle between a touch panel and a pen, and locations of the portable terminal and the user when a pen input is received.

In the case of a portable terminal such as a smart phone or a tablet terminal that is currently used, a hand writing function using an EMR pen is increasingly adopted. When the user uses a pen, it is highly important to enable the user to write a text or draw a figure in an exact location desired by the user.

To this end, an exemplary apparatus and a method for providing lookup tables for a characteristic of the user who uses the pen, a location of the portable terminal when in use, and/or a characteristic of a touch panel and for compensating an input from the pen according to the above characteristic when the pen is used in the portable terminal are suggested. Here, the user's characteristic refers to whether the user is left handed or right handed, which affects the pen input. Therefore, it is preferable to consider the user's preferred hand. Also, when using the pen, it is preferable to place the pen to be perpendicular to the touch panel. This is because the EMR pen has the highest magnetic characteristic when the EMR pen is perpendicular to a touch sensor board. However, when the pen input is generated by the user, the pen is tilted at a certain angle by the user according to the user's preference. Therefore, it is preferable to consider the user's most commonly used angle of the pen relative to the touch panel. Also, the pen input can be varied depending on the location of the portable terminal and the user's location. Therefore, it is preferable to consider the location of the portable terminal and the user's location when the pen input is generated.

Also, the touch panel of the portable terminal may have different touch sensitivity in a center area as compared to a peripheral area. This difference is because, in the center area of the touch panel, a pen detection point is denser and a signal strength is stronger as compared to the peripheral area. Therefore, the probability of error in touch detection is higher in the peripheral area than the center area so that compensating detection accuracy in the peripheral area is needed.

In exemplary embodiments of the present invention, a lookup table is provided for setting a pen input coordinate by considering a user characteristic and/or a touch panel characteristic, as described above, to improve the input characteristic of the pen.

FIG. 1 is a view illustrating a configuration of a portable terminal according to an exemplary embodiment of the present invention.

Referring to FIG. 1, when a touch by the pen is generated, a touch panel 120 generates a signal that varies depending upon the position at which the touch is generated. In other words, the touch panel 120 generates a touch location signal when the touch is generated. In an exemplary implementation, the touch panel 120 may be a capacitive type touch sensor. Also, the touch panel 120 may be a sensor board that can recognize an EMR.

A sensor 140 detects a position of the portable terminal. The sensor 140 may be an acceleration sensor, a geomagnetic sensor, a position sensor, and the like. As an example, the sensor 140 detects a location or orientation in which the portable terminal is placed.

A memory 110 may include a program memory, which stores a program for controlling an operation of the portable terminal and a program in accordance with an exemplary embodiment, and a data memory, which stores data required for executing a program and data produced during execution of the program. The memory 110 stores at least one lookup table for compensating the accuracy of the pen input according to an exemplary embodiment of the present invention.

The controller 100 controls operations of the portable terminal and controls an operation to improve the accuracy of the pen input received through the touch panel 120 according to an exemplary embodiment of the present invention. For example, the controller 100 may recognize a user's preferred hand (e.g., right hand or left hand) that grips the pen or an angle at which the pen is tilted through a program setting (or registering) mode. Also, the controller 100 can detect a position of the portable terminal relative to the user (i.e., a direction and an angle of the portable terminal placed in front of the user) based on an output of the sensor 140 in a pen input mode. The controller 100 analyzes the user characteristic that is set as described above and the output of the sensor 140 and selects the lookup table of the memory 110 according to the user characteristic and the position of the terminal. Upon detecting the pen input through the touch panel 120, compensation data of the lookup table according to a position of the pen input is detected to compensate for the pen input coordinate.

The display unit 130 displays the compensated pen input under control of the controller 100. The communication unit 150 may be provided or not depending on the portable terminal. Here, when the portable terminal is provided with a call communication feature such as a smart phone, the communication unit 150 may perform a Long Term Evolution (LTE), Wideband Code Division Multiple Access (WCDMA) or Global System for Mobile communications (GSM) communication. Also, a data communication unit such as Wi-Fi, Worldwide Interoperability for Microwave Access (WIMAX) or Wireless Broadband (WIBRO) may be further provided. Further, when the portable terminal is a tablet or an MP3 terminal that does not have a communication feature, the communication unit 150 may be the data communication unit such as Wi-Fi, WIMAX, or WIBRO. Such portable terminal may be a terminal that has a touch sensor and does not perform a communication function. In this case, the communication unit 150 may be omitted.

Here, the lookup table stored in the memory 110 has a value that compensates for a difference in touch sensitivity of the center area and the peripheral area of the touch panel 120. Namely, in case of the touch panel 120, the center area of the touch panel 120 generates a relatively strong touch detection signal compared with the peripheral area (e.g., corner and edge areas of the touch panel). In other words, in the peripheral area of the touch panel 120, a signal that detects the touch has a relatively weak signal strength compared with a signal in the center area, and thus, when the peripheral area is touched by the pen, a touch coordinate may not be correctly recognized as compared with the center area. Therefore, the lookup table stores compensation data specified through experiments to compensate for an input error in the center area and the peripheral area of the touch panel 120. The compensation data of the lookup table may have a pixel unit and may be set to have a predetermined interval.

Figure 2:
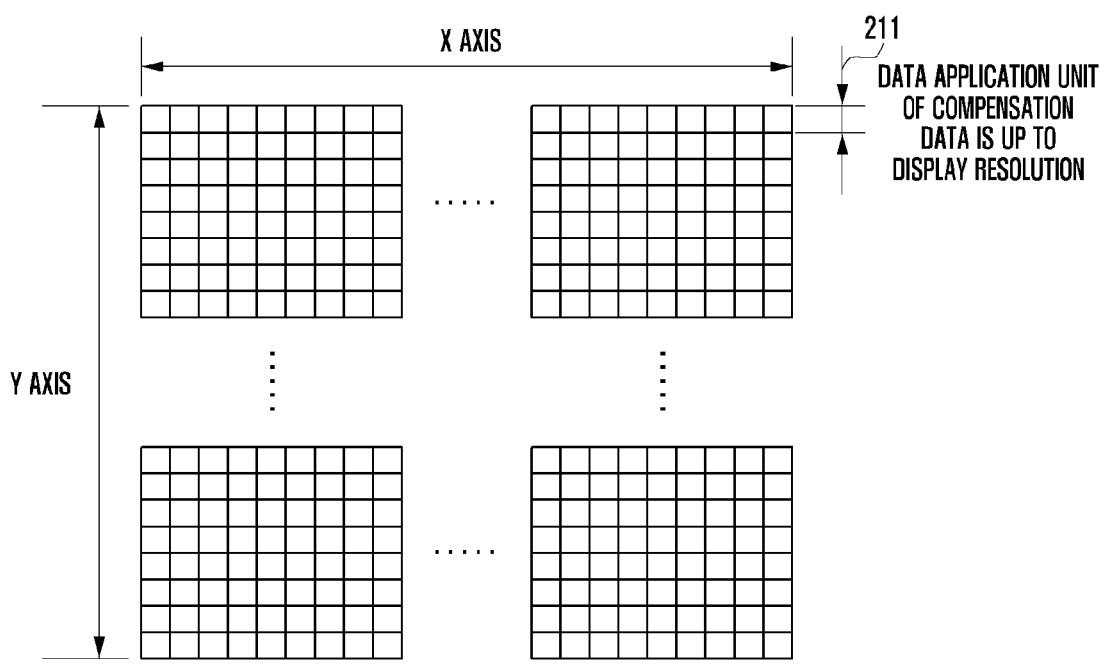
FIG. 2 is a view illustrating a structure of a compensation data table according to an exemplary embodiment of the present invention.

FIG. 2 is a view illustrating a structure of a compensation data table according to an exemplary embodiment of the present invention. FIG. 2 is given to explain a unit in which the compensation data is applied and the table shown in FIG. 2 may have a lookup table structure.

Referring to FIG. 2, reference numeral 211 illustrates a data application unit of the compensation table. The data application unit may correspond to a display resolution of the display unit 130 or may be set as a predetermined interval (e.g., 2 millimeters (mm)) In other words, the lookup table shown in FIG. 2 may apply the compensation data with respect to all coordinates and may determine a compensation data application unit (e.g., in pixel or predetermined interval) and the number of the compensation data table depending on target accuracy and a range of user environments to be considered.

The lookup table may be generated in a structure corresponding to a user's pen usage characteristic. Here, the user's pen usage characteristic may be the hand preferred by the user or an angle at which the pen is tilted when used. When the pen is used, an error of a touch coordinate may be different depending on which hand of the user grips the pen. In other words, input coordinates of the pen may be detected differently depending on whether the user is left handed or right handed. Therefore, the lookup table is preferably generated separately for a left handed user and a right handed user. Also, when the touch panel 120 is touched by the pen, the input coordinate detected in the touch panel 120 may be different depending on the angle at which the pen is tilted. This is because the EMR pen uses a magnetic characteristic and magnetic charge is produced differently when the pen touches the touch panel 120 in a perpendicular direction and when the pen is tilted in a certain angle. Accordingly, an error between an actual touch position in the touch panel 120 and a touch position detected by the touch panel 120 may occur. Therefore, a lookup table including data for compensating a touch position error may be generated by measuring the touch position error in the touch panel 120 with respect to the angle of the pen (e.g., 5 degree of tilt from a vertical line of the touch panel).

Therefore, the lookup table may include N number of compensation tables. Here, the number N may be determined by, for example, which user's hand grips the pen, the pen's angle when used, or a direction of the touch panel relative to the user. For example, the user's hand that grips the pen is a right hand or a left hand, i.e., 2 hands, the angle of the pen is measured at every 5 degrees up to 30 degrees, i.e., 6 total angles, and the direction of the touch panel relative to the user may be measured in units of 45 degrees, i.e., 8 total directions. In this case, the number N of the lookup tables can be determined by (the number (2) of possible user's preferred hands)×(the number (6) of possible angles of pen)×(the number (8) of possible directions of the touch panel)=96. The lookup tables may be generated when manufacturing the portable terminal and stored in the memory 110. Alternatively, the lookup tables may be downloaded to be stored from a manufacturer through data communication. Also, an appropriate number of the lookup tables may be downloaded to be stored according to the user's characteristic (user's preferred hand to grip the pen and the angle of the pen when used) and the direction of the portable terminal. In the portable terminal having the above configuration, the controller 100 may include a pen input compensation apparatus as shown in FIG. 3.

Figure 3:
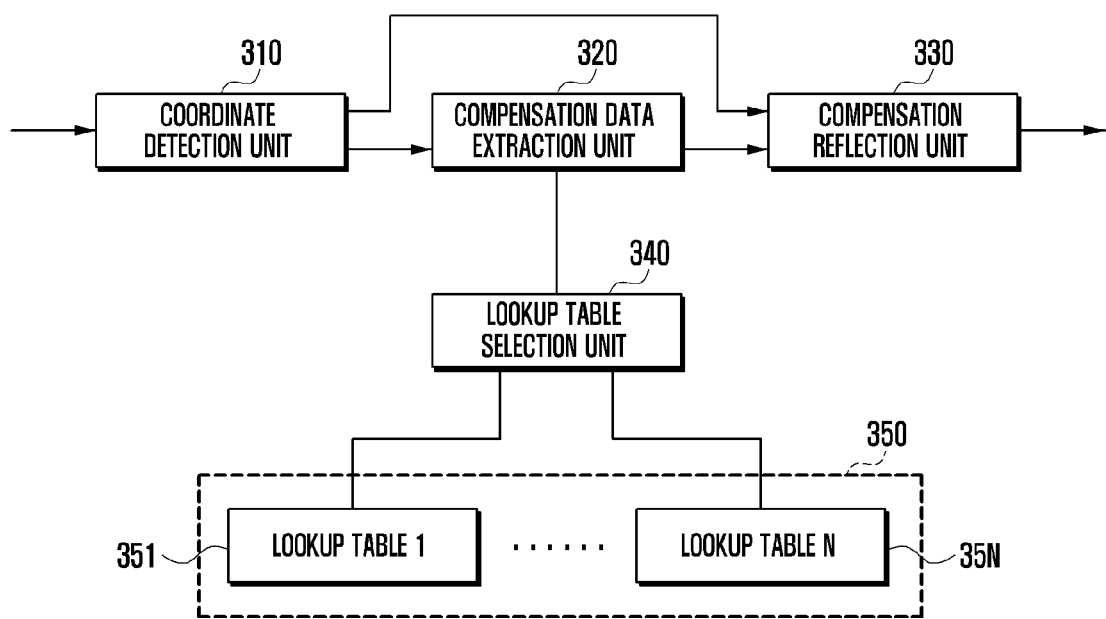
FIG. 3 is a view illustrating a configuration of a pen input compensation unit which compensates an input of a pen outputted from a touch panel according to an exemplary embodiment of the present invention.

FIG. 3 is a view illustrating a configuration of a pen input compensation unit which compensates an input of a pen outputted from a touch panel according to an exemplary embodiment of the present invention. Here, the compensation unit shown in FIG. 2 may be included in the controller 100 or positioned between the controller 100 and the touch panel 120. In the present exemplary embodiment, the compensation unit is assumed to be included in the controller 100.

Referring to FIG. 3, the number N of lookup table 350 is determined by the user's preferred hand, the pen's angle and the direction in which the touch panel 120 is placed. Here, the lookup table 350 may include N number of lookup tables 351-35N. The lookup table that stores the compensation data is a table that stores the compensation data of the input coordinate. Here, the compensation data may be a coordinate value to be compensated or a compensation data that moves the input coordinates to a position (or coordinate) to be compensated. A unit of the compensation data may be arbitrarily set as shown in FIG. 2 and can be supported up to the resolution (i.e., pixel unit) of the display unit 130. Also, the lookup table may store separate compensation data with respect to an entire area of the touch panel 120. A lookup table selection unit 340 selects a lookup table according to the user's preferred hand, the angle of the pen, and the direction of the touch panel 120.

A coordinate detection unit 310 detects an input coordinate of the pen that touches the touch panel 120 and outputs the detected coordinate to a compensation data extraction unit 320 and a compensation reflection unit 330. Here, an output of the coordinate detection unit 310, which is not processed data, transmits the coordinate to which a compensation value is to be reflected. Namely, the detected input coordinate may have an error from an intended coordinate due to the user's preferred hand that grips the pen, the angle of the pen, and the direction of the touch panel.

The compensation data extraction unit 320 extracts the compensation data corresponding to the detected coordinate in the selected lookup table. The compensation data extraction unit 320 extracts the compensation data of a corresponding coordinate by using the coordinate transmitted from the coordinate detection unit 310. Namely, the compensation data extraction unit 320 indexes the lookup table with the coordinate received from the coordinate detection unit 310 to extract the compensation data and outputs the extracted compensation data to the compensation reflection unit 330. Namely, the compensation data extraction unit 320 extracts the compensation data with respect to the coordinate received from the coordinate detection unit 310 from the selected lookup table.

The compensation reflection unit 330 reflects the compensation data to the input coordinate detected by the coordinate detection unit 310 to generate a compensated coordinate value. The compensation reflection unit 330 may reflect the compensation data transmitted from the compensation data extraction unit 320 to the input coordinate transmitted from the coordinate detection unit 310 to generate a final coordinate that compensates for an input error.

Figure 4:
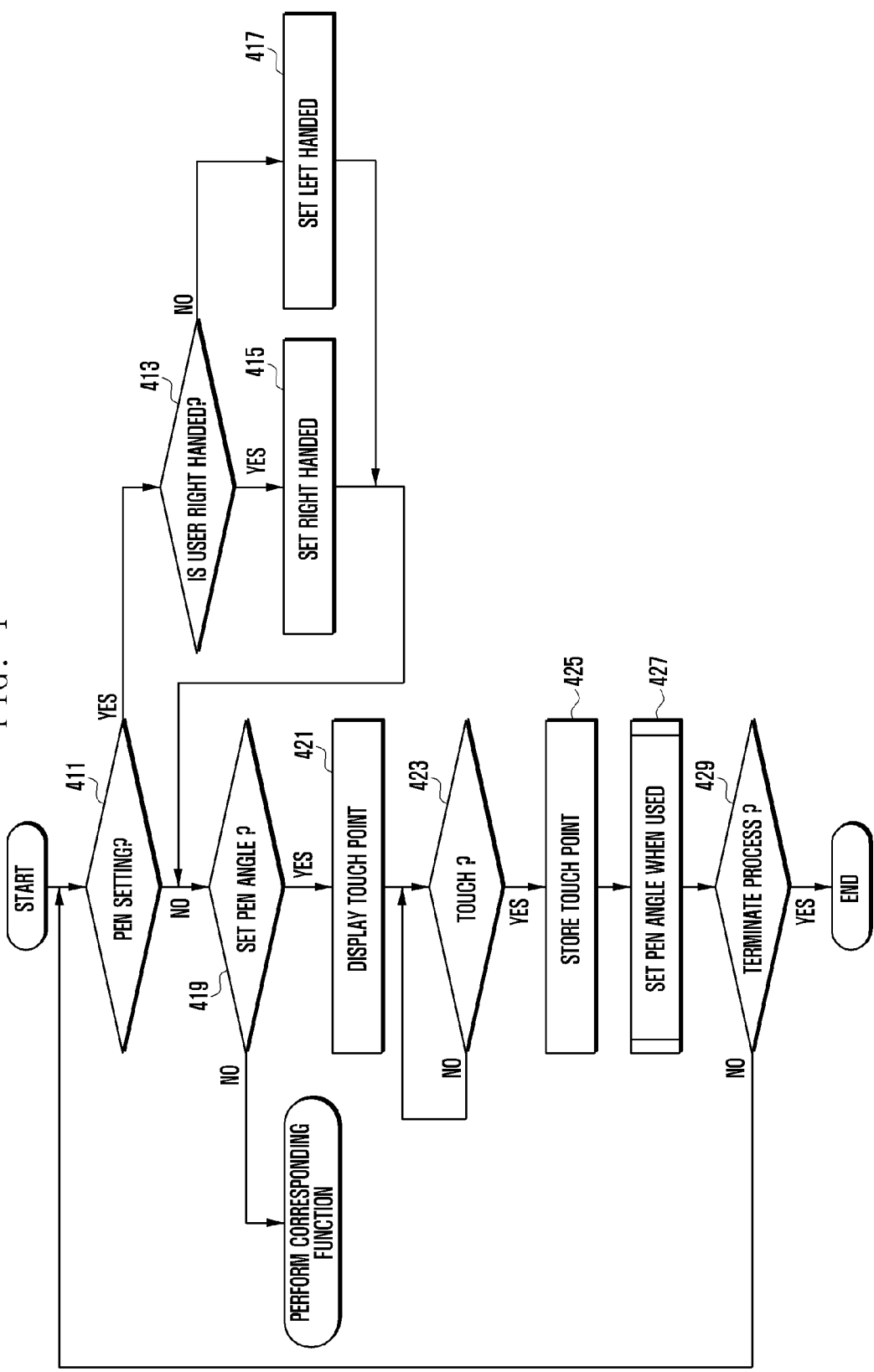
FIG. 4 is a flowchart illustrating a process of setting a user's preferred hand and an angle of a pen in a portable terminal using a pen input according to an exemplary embodiment of the present invention.

FIG. 4 is a flowchart illustrating a process of setting a user's preferred hand and an angle of a pen in a portable terminal using a pen input according to an exemplary embodiment of the present invention. Here, the portable terminal includes multiple lookup tables according to the user's preferred hand and the angle of the pen when used.

In the exemplary embodiment of the present invention, setting for the pen input can be performed in a program registration (or setting) mode. Namely, in a program registration menu, a pen setting menu and a pen angle setting menu are displayed such that a corresponding function may be performed according to a user's selection. Here, when the user selects a pen setting item in the menu, the controller 100 displays items shown in Table 1 below on the display unit 130.

TABLE 1

| | |
|---|---|
| ☐ | Right-handed |
| ☐ | Left-handed |
| ☐ | cancel |

When the user selects a corresponding item, the controller 100 sets the selected item.

Also, when the user selects the pen angle setting item in the menu, the controller 100 displays a touch point in the display unit 130. Here, the touch point displayed on the display unit 130 is a reference coordinate, which can have a coordinate value touched by the pen in a vertical direction. Here, when the user touches the corresponding touch point by using the pen, the controller 100 may compare the reference coordinate value with a coordinate value touched with the pen being tilted at a certain angle to set the angle of the pen. In other words, the controller 100 includes touch error values with respect to the touch point according to an angle at which the pen is tilted and estimates the angle of the pen when used by detecting an error value between the reference value and an actual touch. Here, it is preferable that the controller 100 subsequently displays touch points of different positions, receives touch coordinates from the touch points of the different positions, and analyzes an error between the reference value and the actual touch coordinate (i.e., coordinate detected according to the angle of the pen) for each touch point, thereby synthetically setting the angle of the pen.

Also, after detecting the pen setting and the angle of the pen, a corresponding lookup table may be selected for use. Here, the lookup tables are provided for the right handed user and the left handed user and each corresponds to the angle of the pen. For example, when there are six lookup tables provided according to the angle of the pen, six lookup tables for the right handed user and six lookup tables for the left handed user are provided. Also, the lookup tables for each angle of the pen may be provided corresponding to possible numbers of the directions of the portable terminal.

Referring to FIG. 4, when the user selects the menu and selects the pen setting item, the controller 100 detects such event at step 411 and displays the items of Table 1 as shown above. Here, when the user selects the right handed item among the displayed items, the controller 110 detects such event at step 413 and sets the user's hand that grips the pen as a right hand at step 415. Also, when the user selects the left handed item among the displayed items, the controller 110 detects such event at step 413 and sets the user's hand that grips the pen as a left hand at step 417.

Also, when the user selects the pen angle setting item, the controller 100 detects such event at step 419 and displays a touch point on the display unit 130 at step 421. Here, when the user uses the pen to touch the displayed touch point, the controller 100 detects such event at step 423 and stores a coordinate value detected by the touch at step 425. A reference coordinate of the touch point and the coordinate value of the touch by the pen are analyzed to obtain an error value and the angle of the pen is determined by comparing stored error values and the obtained error value at step 427. The above operation may include displaying the touch point in various positions, detecting coordinates at which corresponding touch points are touched by the user, and analyzing detected error values to synthetically set the angle of the pen. The above described process may be repeatedly performed until the pen angle setting is completed. When completion of the pen angle setting is detected, the controller 100 detects such event and terminates the pen setting and angle setting operations at step 429.

Figure 5:
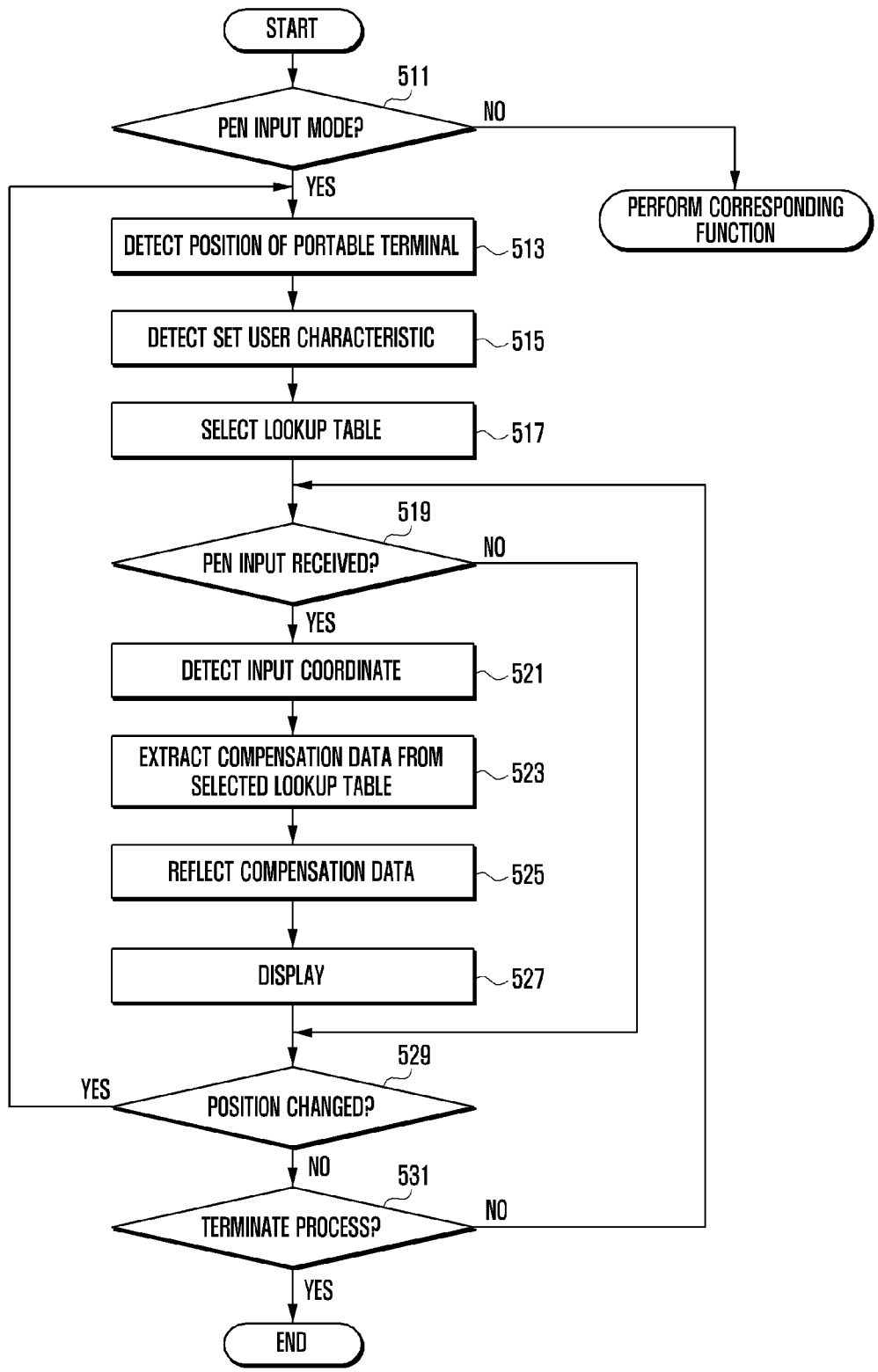
FIG. 5 is a flowchart illustrating a process of compensating a pen input in a portable terminal according to an exemplary embodiment of the present invention.

FIG. 5 is a flowchart illustrating a process of compensating a pen input in a portable terminal according to an exemplary embodiment of the present invention.

Referring to FIG. 5, in the pen input mode, the controller 100 detects the pen input mode at step 511 and detects a position of the portable terminal through the sensor 140 at step 513. Here, the position of the portable terminal is used to identify a position of the user and the touch panel 120, and to identify whether the position of the portable terminal is in a horizontal direction (0 degree or 180 degrees), a vertical direction (90 degrees or 270 degrees), or a diagonal direction (45 degrees, 135 degrees, 225 degrees, or 315 degrees). The controller 100 detects the user characteristic (e.g., whether the user is left handed or right handed or the angle of the pen) that is set at step 515 and selects a corresponding lookup table at step 517. Namely, in the pen input mode, an optimal lookup table is selected by considering with which hand the user grips the pen, the angle of the pen set by the user, and the position of the portable terminal.

When the pen input is generated, the controller 100 detects such event at step 519, detects a coordinate at which the pen touch is generated through the touch panel 120 at step 521, extracts compensation data of the lookup table corresponding to the coordinate at which the touch is generated at step 523, and generates a compensated input by reflecting the extracted compensation data to the input coordinate at step 525. The controller 100 displays the compensated input through the display unit 130 at step 527. The above operation is repeatedly performed whenever the pen touch is generated on the touch panel 120 and the controller 100 compensates the input coordinate with the data from the lookup table and displays the compensated input coordinate on the display unit 130.

In the above circumstance, when the portable terminal changes a position thereof, the controller 100 detects such event at step 529, and upon detecting a position change, the controller 100 returns to step 513 to select the optimal lookup table.

When the pen input mode is completed by repeating the above operation, the controller 100 detects such event and terminates the pen input mode at step 531.

FIG. 6 is a view illustrating a result of compensating a pen input in a portable terminal according to an exemplary embodiment of the present invention.

As described above, in the exemplary embodiments of the present invention, the portable terminal using the pen input method has improved accuracy of the pen input by using the lookup table when the pen input is generated. Also, the lookup table according to the exemplary embodiments of the present invention is generated in consideration of the user's pen usage characteristic (user's hand that grips the pen or the angle of the pen when used) and the direction of the portable terminal with respect to the user. When using the pen input compensation method as described above, an effect as shown in FIG. 6 can be obtained. Namely, as shown in the diagram labeled 'after improvement', the accuracy of the pen input is improved in both cases where the user uses the pen in a vertical direction and where the user uses the pen at an angle.

Also, in the exemplary embodiments of the present invention, the lookup table is configured by considering both the user's pen usage characteristic (or habit) and the position of the portable terminal, and the pen input is compensated based on the lookup table. However, the pen input accuracy may be improved by using only a part thereof. First, when selecting the lookup table in the portable terminal, only the user's hand that grips the pen may be considered. In this case, the user may select the lookup table according to the hand that grips the pen when entering the pen input. Here, the lookup table may be configured as a lookup table for a left handed user and a lookup table for a right handed user. Second, the lookup table may be configured by considering only the angle of the pen tilted by the user. In this case, only the lookup tables corresponding to the set angle of the pen tilted by the user may be considered. Third, the lookup table may be configured by considering the user's hand that grips the pen and the angle of the pen tilted by the user. In this case, the lookup table may be configured as a set of lookup tables for the left handed user and the right handed user, wherein each set of the lookup tables may be configured as lookup tables corresponding to the set angle of the pen tilted by the user.

Further, in the exemplary embodiments of the present invention, the lookup table may be selected according to the user's choice. In FIG. 5, when selecting the lookup table, the lookup table is selected by considering the user's usage characteristic (or habit) and the direction of the portable terminal. However, a mode for allowing the user to select the lookup table, e.g., a mode for selecting the user's hand that grips the pen, a mode for selecting the angle of the pen when used and/or a mode for setting a direction of the portable terminal, may be displayed in the pen input mode such that the user selects a desired mode to select the lookup table.

According to the exemplary embodiments of the present invention, in the portable terminal having a pen input function, the pen input is compensated to improve accuracy. Accordingly, user convenience is improved. Namely, an error in the pen input may be compensated in various manners according to the user's pen usage characteristic such as a vertical pen angle or whether the user is left handed.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. An input apparatus of a portable terminal, the input apparatus comprising:
   a touch panel configured to generate an input signal according to a pen touch;
   a memory configured to store at least one lookup table in which data for compensating an error of a pen input according to a user's pen usage characteristic and at least one of a position and an orientation of the portable terminal is stored;
   a controller configured to:
      detect an input coordinate of the pen touch on the touch panel,
      detect the at least one of the position and the orientation of the portable terminal via a sensor, and
      extract compensation data from the lookup table corresponding to the input coordinate to compensate the error of the pen input at certain intervals along an input path; and
   a display unit configured to display a compensated pen input signal,
   wherein the user's pen usage characteristic comprises a user's hand that grips the pen and an angle of the pen when used by the user, and wherein the lookup table comprises a lookup table set for a left handed user and a lookup table set for a right handed user, and each lookup table set comprises a plurality of lookup tables corresponding to an angle of the pen when used and at least one of position and orientation.

2. The input apparatus according to claim 1, wherein the controller comprises:
a coordinate detection unit configured to detect the input coordinate of the pen touch on the touch panel;
a compensation data extraction unit configured to extract the compensation data corresponding to the input coordinate from the lookup table by using the input coordinate as an index; and
a compensation reflection unit configured to generate the compensated pen input signal by reflecting the extracted compensation data to the input coordinate outputted from the coordinate detection unit.

3. The input apparatus according to claim 2, wherein the lookup table comprises a lookup table for a left handed user and a lookup table for a right handed user, and wherein the controller further comprises:
a lookup table selection unit configured to select a lookup table that is set by a user for use when the pen input is received.

4. The input apparatus according to claim 2, wherein the lookup table comprises a plurality of lookup tables corresponding to an angle of a pen when used, and wherein the controller further comprises:
a lookup table selection unit configured to select a lookup table corresponding to the angle of the pen formed by the user when the pen input is received.

5. The input apparatus according to claim 3, wherein the lookup table comprises a lookup table set for the left handed user and a lookup table set for the right handed user, and each lookup table set comprises a plurality of lookup tables corresponding to an angle of a pen when used, and wherein the controller further comprises:
a lookup table selection unit configured to select a lookup table, which corresponds to a hand of the user that grips the pen and the angle of the pen when used, for use when the pen input is received.

6. The input apparatus according to claim 5, further comprising a sensor configured to detect a direction of the portable terminal, wherein the lookup table comprises the lookup table set for the left handed user and the lookup table set for the right handed user, and each lookup table set comprises the plurality of the lookup tables corresponding to the angle of the pen when used and the direction of the portable terminal, and wherein the controller further comprises:
a lookup table selection unit configured to select a lookup table, which corresponds to the hand of the user that grips the pen, the angle of the pen when used, and the direction of the portable terminal detected by the sensor, for use when the pen input is received.

7. The input apparatus according to claim 6, wherein the pen is an electro magnetic resonance pen.

8. A method of compensating a pen input of a portable terminal, the method comprising:
detecting an input coordinate of a pen according to a touch on a touch panel of the portable terminal, the portable terminal including the touch panel configured to generate an input signal according to a pen touch and a memory configured to store at least one lookup table in which data for compensating an error of the pen input according to a user's pen usage characteristic and at least one of a position and an orientation of the portable terminal is stored;
detecting the at least one of the position and the orientation of the portable terminal via a sensor;
extracting compensation data corresponding to the input coordinate from the lookup table by using the input coordinate as an index;
generating a compensated pen input signal by reflecting the extracted compensation data to the input coordinate at certain intervals along an input path outputted from a coordinate detection unit; and
displaying the compensated pen input signal on a display unit,
wherein the user's pen usage characteristic comprises a user's hand that grips the pen and an angle of the pen when used by the user, and
wherein the lookup table comprises a lookup table set for a left handed user and a lookup table set for a right handed user, and each lookup table set comprises a plurality of lookup tables corresponding to an angle of the pen when used and at least one of position and orientation of the portable terminal.

9. The method according to claim 8, wherein the lookup table comprises a lookup table for a left handed user and a lookup table for a right handed user, and wherein the method further comprises:
setting a lookup table to be used according to a user's choice in a pen setting mode, wherein the generating of the compensated pen input signal comprises extracting the compensation data from the set lookup table by using the input coordinate of the pen as the index.

10. The method according to claim 8, wherein the lookup table comprises a plurality of lookup tables corresponding to an angle of the pen when used, and wherein the method further comprises:
setting a lookup table to be used according to a user's choice in a pen angle setting mode, wherein the generating of the compensated pen input signal comprises extracting the compensation data from the set lookup table by using the input coordinate of the pen as the index.

11. The method according to claim 9, wherein the lookup table comprises a lookup table set for the left handed user and a lookup table set for the right handed user, and each lookup table set comprises a plurality of lookup tables corresponding to an angle of the pen when used, and wherein the method further comprises:
setting the lookup table to be used according to the user's choice in a pen setting mode, and setting the lookup table to be used according to the user's choice in a pen angle setting mode, wherein the generating of the compensated pen input signal comprises extracting the compensation data from the set lookup table by using the input coordinate of the pen as the index.

12. A method of compensating a pen input of a portable terminal, the method comprising:
selecting a lookup table in a pen input mode according to at least one of a position and an orientation of the portable terminal and a preset user's pen usage characteristic by detecting at least one of position and orientation of the portable terminal, the portable terminal including a touch panel configured to generate an input signal according to a pen touch, a sensor configured to detect the at least one of the position and the orientation of the portable terminal, and a memory configured to store at least one lookup table in which data for compensating an error of the pen input according to the user's pen usage characteristic and the at least one of the position and the orientation of the portable terminal is stored; and compensating a pen input signal by reflecting compensation data of the lookup table selected upon detection of the pen input corresponding to a coordinate of the pen input at certain intervals along an input path and displaying the compensated pen input signal, wherein the user's pen usage characteristic comprises a user's hand that grips the pen and an angle of the pen when used by the user, and wherein the lookup table comprises a lookup table set for a left handed user and a lookup table set for a right handed user, and each lookup table set comprises a plurality of lookup tables corresponding to an angle of the pen when used and at least one of position and orientation of the portable terminal.

13. The method according to claim 12, wherein the compensating of the pen input signal and the displaying of the compensated pen input signal comprises:

detecting a coordinate of the pen input according to a touch on the touch panel;

extracting compensation data corresponding to the coordinate of the pen input from the lookup table by using the coordinate as an index;

generating a compensated pen input signal by reflecting the extracted compensated data to the input coordinate outputted from the coordinate detection unit; and displaying the compensated pen input signal.

14. The method according to claim 13, wherein the compensating of the pen input signal further comprises:

re-selecting the lookup table according to a changed direction of the portable terminal and the preset user's pen usage characteristic when a change of a position of the portable terminal is detected.

15. The method according to claim 13, further comprising:

setting a lookup table to be used according to a user's choice in a pen setting mode; and setting the lookup table to be used according to the user's choice in a pen angle setting mode.

* * * * *